(12) United States Patent
Zhu

(10) Patent No.: US 8,407,352 B2
(45) Date of Patent: Mar. 26, 2013

(54) METHOD AND APPLICATION SERVER FOR USING A SIP SERVICE FROM A NON-SIP DEVICE

(75) Inventor: Zhongwen Zhu, Saint-Laurent (CA)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 278 days.

(21) Appl. No.: 12/696,830

(22) Filed: Jan. 29, 2010

(65) Prior Publication Data

US 2011/0191483 A1    Aug. 4, 2011

(51) Int. Cl.
*G06F 15/16* (2006.01)
(52) U.S. Cl. ...................................................... 709/228
(58) Field of Classification Search .................... 709/228
See application file for complete search history.

(56) References Cited

U.S. PATENT DOCUMENTS

2011/0214051 A1* 9/2011 Petronijevic et al. ......... 715/255
2011/0252091 A1* 10/2011 Chitturi ......................... 709/204

FOREIGN PATENT DOCUMENTS

WO    2009/097902 A1    8/2009
WO    2009/104998 A1    8/2009

OTHER PUBLICATIONS

Suresh Chitturi et al.: Additional details of CAB-01 interface in Solution #1, OMA MWG-CAB, XP002638688, Sep. 23, 2008; 13 pages.
CAB AHG topics for the PAG-CAB JM in Singapore, CAB Convertor, XP002638689; Aug. 10, 2009; 4 pages.
Converged Address Book (CAB) Specification, Draft Version 1.0—Jan. 6, 2010; Open Mobile Alliance, OMA-TS-CAB-V1_0-20100106-D, XP002638690; 39 pages.
XML Document Management (XDM) Specification, Draft Version 2.1—Jan. 19, 2010; Open Mobile Alliance, OMA-TS-XDM-Core-V2_1-20100119-D, XP002638691, 112 pages.
Converged Address Book Requirements, Candidate Version 1.0—Dec. 17, 2008; Open Mobile Alliance, OMA-RD-CAB-V1_0-20081217-C, XP002604550, Dec. 17, 2008; 24 pages.
International Search Report for PCT/IB2011/050394 dated Jun. 15, 2011; 4 pages.

* cited by examiner

*Primary Examiner* — Ryan Jakovac
(74) *Attorney, Agent, or Firm* — Murphy, Bilak & Homiller, PLLC

(57) ABSTRACT

A method and an Application Server for enabling a non-SIP device to use a SIP service are described. The method is executed in an Application Server and comprises the steps of receiving a request for a SIP service from a non-SIP device. The method comprises retrieving a contact card corresponding to the non-SIP device from a Contact Server, the contact card containing at least one identity. The method also comprises inserting the at least one identity retrieved from the contact card in the request for the SIP service and forwarding the request for the SIP Service to the Service Server.

14 Claims, 4 Drawing Sheets

METHOD AND APPLICATION SERVER FOR USING A SIP SERVICE FROM A NON-SIP DEVICE

TECHNICAL FIELD

The present invention generally relates to communication networks. More specifically, it relates to the use services in communication networks.

BACKGROUND

During the past years, the interest in using mobile and landline/wireline computing devices in day-to-day communications has increased. Desktop computers, workstations, and other wireline computers currently allow users to communicate, for example, via e-mail, video conferencing, and instant messaging (IM). Mobile devices, for example, mobile telephones, smartphones, handheld computers, personal digital assistants (PDAs) etc., also allow the users to communicate via e-mail, video conferencing, IM, and the like.

Mobile telephones have conventionally served as voice communication devices, but through technological advancements they have recently proved to be effective devices for communicating data, graphics, documents, etc. Wireless and landline technologies continue to merge into a more unified communication system, as user demand for seamless communications across different platforms increases.

Many communication applications allow for real-time or near real-time communication that falls outside of the traditional voice communication associated with wireline and wireless telephone communications. Chat session, instant messaging, Short Message Service (SMS), video conferencing, are a few such communication vehicles.

Many of these types of communications are expected to become increasingly popular, particularly in view of the proliferation of wireless devices and continual technological breakthroughs in this area.

One method for facilitating the above mentioned communication vehicles relates to the contact subscription service technology that can be used to update contact information automatically. Indeed, the contact subscription service facilitates the update of the contact information in a mobile device. With this service, contact information is updated without user intervention and therefore users may use the other services without having to worry about updating their contacts information.

The IP Multimedia Subsystem (IMS) is a network system that is based on the Session Initiation Protocol (SIP), which is suitable to be used as a platform for a broad range of advanced Internet-based multimedia services and applications, such as e.g. the contact subscription service, on top of a packet switched network.

A mechanism of subscription and notification based upon SIP protocol is used in the IMS. This mechanism has been adopted to build eXtensible Markup Language (XML) Document Management (XDM) services in Open Mobile Alliance (OMA).

An XDM enabler specifies how user-specific, service-related information is represented in structured XML documents, as well as the common protocol for accessing and manipulating said documents, e.g. creating, changing, deleting, etc. these XML documents.

Features of the XDM enabler include XML Configuration Access Protocol (XCAP), by which users can store and manipulate their service-related data, stored in the network as XML documents. Documents accessed and manipulated via XCAP are stored in logical repositories in the network, called XML Document Management Servers (XDMS).

Each XML document stored in an XDMS is described as an Application Usage, which enables applications to use the document via XCAP. The XDM enabler describes Application Usages which can be reused by multiple enablers and are stored in logical entities called Shared XDMSs.

Under the current XDM architecture, a XDM Client (XDMC) shall have both SIP and XCAP capabilities. Hence the identity of a user, i.e. the user's SIP Uniform Resource Identifier (URI), can be used as a XCAP User Identity (XUI) to build a directory hierarchy in which the XML document may be stored. It also allows an XDMS to send SIP SUBSCRIBE and receive SIP NOTIFY on the behalf of the user by using the user's SIP URI.

However, terminal device manufacturers are not willing to put any SIP stack in mobile devices due to implementation cost and complexity. It is foreseen, most devices that will be released on the market will not implement SIP stacks.

In the ongoing OMA Converged Address Book working group, indications have been clear that non-SIP devices should be supported. As a result, a terminal device is not required to support SIP stack. It implies that the corresponding user is not required to have a SIP URI for his/her identification.

Thus, as it can be seen, non-SIP devices may not be able to use SIP protocol and therefore services such as a contact subscription service may not work for these devices. The present invention aims at providing a solution that solves at least some of the aforementioned problems.

SUMMARY

In accordance with one aspect of the present invention, there is provided a method for using a SIP service from a non-SIP device. The method is executed in an Application Server and comprises the steps of receiving a request for a SIP service from a non-SIP device. The method comprises retrieving a contact card corresponding to the non-SIP device from a Contact Server, said contact card containing at least one identity. The method also comprises inserting the at least one identity retrieved from the contact card in the request for the SIP service and forwarding the request for the SIP Service to the Service Server.

In accordance with another aspect of the present invention, there is provided an Application Server for enabling a non-SIP device to use a SIP service. The Application Server comprises a first input interface for receiving a request for a SIP service from a non-SIP device. The Application Server further comprises a second input interface for retrieving a contact card corresponding to the non-SIP device from a Contact Server, said contact card containing at least one identity. The Application Server further comprises a processor for inserting the at least one identity retrieved from the contact card in the request for the SIP service and an output interface for forwarding the request for the SIP Service to the Service Server.

BRIEF DESCRIPTION OF THE DRAWINGS

The objects and advantages of the invention will be understood by reading the detailed description in conjunction with the figures, wherein.

DETAILED DESCRIPTION

Figure 1:
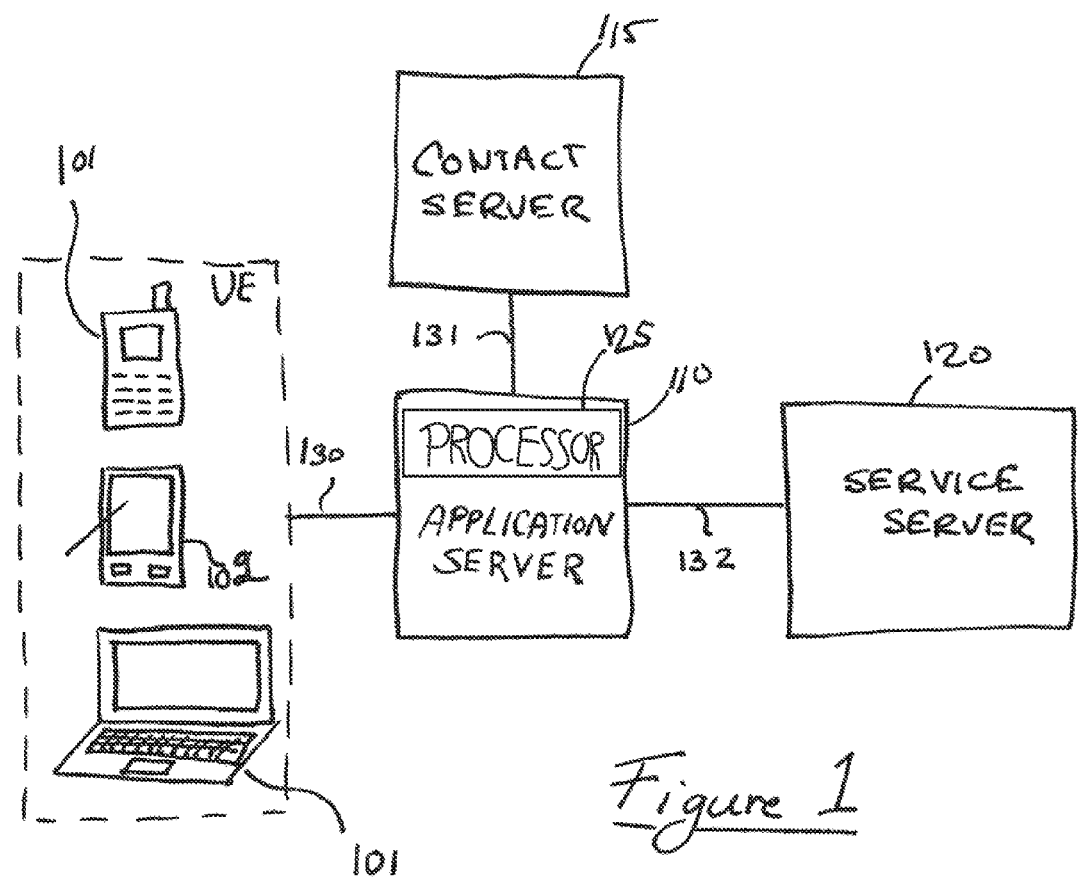
FIG. 1 is a schematic view of elements of a communication networks according to the invention.

The various features of the invention will now be described with reference to the figures. These various aspects are described hereafter in greater detail in connection with an exemplary embodiment and example to facilitate an understanding of the invention, but should not be construed as limited to this embodiment. Rather, this embodiment is provided so that the disclosure will be thorough and complete, and will fully convey the scope of the invention to those skilled in the art.

The embodiment according to the present invention is described with reference to block diagrams and/or operational illustrations of methods, network nodes, and computer program products. It is to be understood that each block of the block diagrams and/or operational illustrations, and combinations of blocks in the block diagrams and/or operational illustrations, can be implemented by radio frequency, analog and/or digital hardware, and/or computer program instructions. Thus, the various aspects of the invention may be embodied in many different forms, and all such forms are contemplated to be within the scope of the invention. The computer program instructions may be provided to a processor circuit of a general purpose computer, special purpose computer, ASIC, and/or other programmable data processing apparatus, such that the instructions, which execute via the processor of the computer and/or other programmable data processing apparatus, create means for implementing the functions/acts specified in the block diagrams and/or operational block or blocks. In some alternate implementations, the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved.

Nowadays, it is common for individuals to own multiple communication devices to manage their personal communications and store personal information. For example, a person can own a mobile phone, a Personal Digital Assistant (PDA), a personal computer at work and/or at home, etc. Some of these devices may be Session Initiation Protocol (SIP) enabled while others may not be. With the ever growing deployment of SIP enabled IP Multimedia Subsystem (IMS) networks, there is a challenge as to how to make non-SIP devices work with IMS networks. Furthermore, there exists another challenge as to how to use a service, such as a Contact Subscription service, for example, using non-SIP Uniform Resource Identifier (URI) i.e. using an eXtensible Markup Language (XML) Configuration Access Protocol (XCAP) User Identity, for example.

Those questions are addressed herein below. One of the many advantages of the solution proposed is that it has a minimum or no impact on the implementation of user equipment. Indeed, a Personal Contact Card (PCC) XML Document Management Server (XDMS) may be used to store and retrieve the user's identities, e.g. in a PCC document stored using XML Configuration Access Protocol (XCAP) User Identifier (XUI). Furthermore, an extension of the existing SIP request and response is made to carry an enhancement of the user's PCC information. The enhancement may include, for example, identities used in social networks such as Facebook® of Twitter®. The corresponding logic is thus introduced in the XDMS to handle this enhancement of the PCC information.

Now turning to FIGS. 1 and 2, a method for using a SIP service from a non-SIP device 101 will be described. The method is executed in an Application Server 110 and comprises the steps of receiving a request for a SIP service from a non-SIP device, step 200, retrieving a contact card corresponding to the non-SIP device from a Contact Server 115, the contact card containing at least one identity, step 201. The method further comprises the step of inserting the at least one identity, such as ue.sipService@example.com, retrieved from the contact card in the request for the SIP service, step 202, and forwarding the request for the SIP Service to the Service Server 120, step 203. The method may further comprise the steps of attaching user information in the request for the SIP service, setting a Require header to the PCC and using Multipurpose Internet Mail Extensions (MIME) format for the request. The user information may comprises at least one of a phone number, an email address and another URI. The other URI may be for example a SIP URI or an URI associated with a service. A response to the request received from the Service Server 120 may then be processed by the Application Server 110. A notification may then be sent to the non-SIP device.

The at least one identity may be, among others, a Session Initiation Protocol (SIP) Uniform Resource Identifier (URI), a Telephone (TEL) URI, an Instant Messaging Presence Protocol (IMPP) address, an email address, etc. and may comprise identities of a plurality of devices of a user. Thus, a user having a plurality of devices (101,102) may see all his devices listed in his PCC. If one of his devices 102 is SIP enabled and has a SIP URI, this identity may preferably be used to request the SIP service. If the user does not have a SIP enabled device, the PCC of this user may nonetheless comprise a SIP URI attributed by the network. This can be done via an operator of a telecommunications network, wherein, for example, the operator may assign a SIP URI to the user in the network, while the SIP URI might never be used on the device. The mapping between the identities may be done in the PCC. In an alternative approach the operator may assign an XUI to the user directly, which may be used in the PCC.

Figure 2:
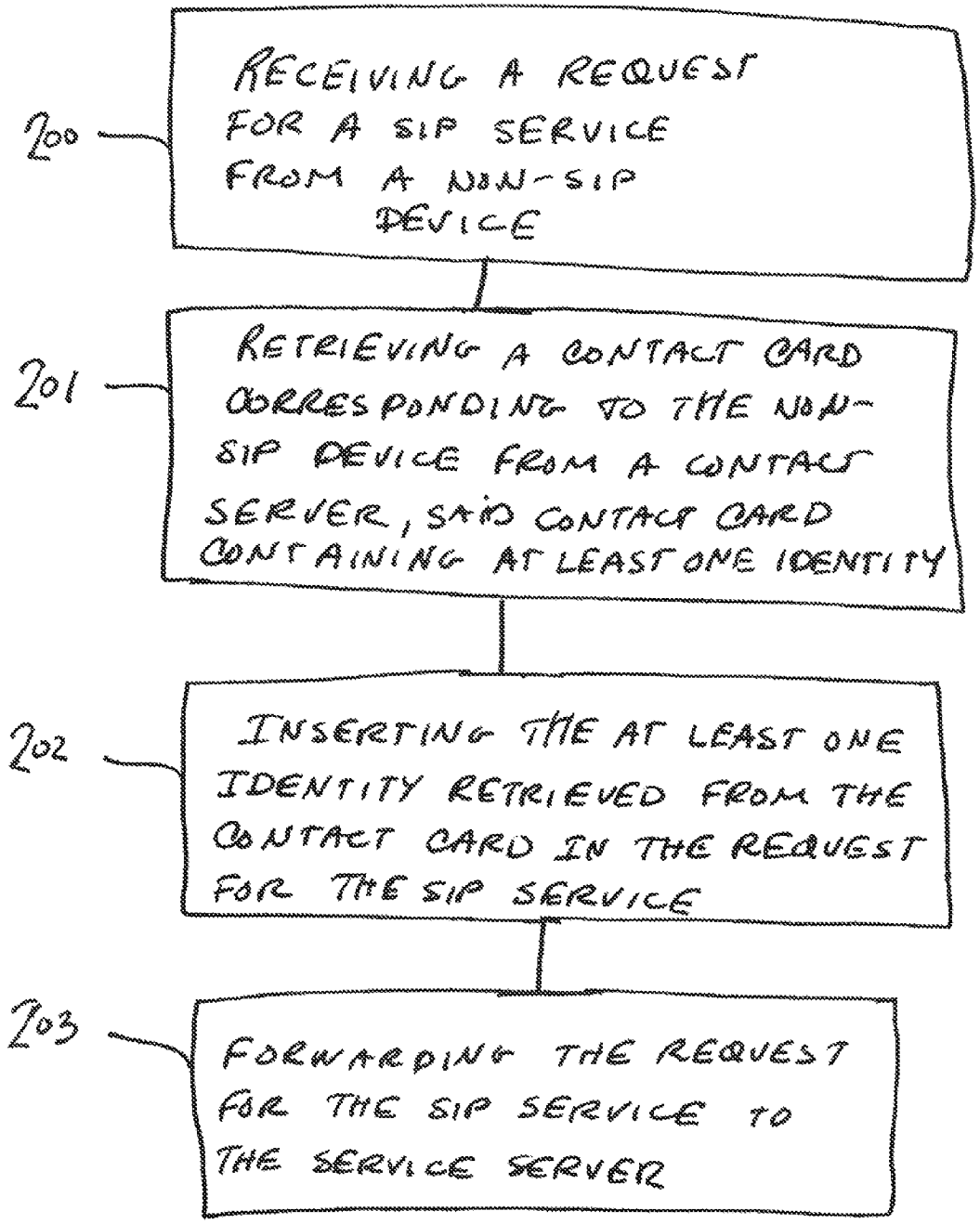
FIG. 2 is a flow chart illustrating a method according to the invention.

Still referring to FIG. 1, an Application Server 110 enables a non-SIP device 101 to use a SIP service and comprises a first input interface 130 for receiving a request for a SIP service from a non-SIP device 101. The Application Server 110 further comprises a second input interface 131 for retrieving a contact card corresponding to the non-SIP device 101 from a Contact Server 115, the contact card containing at least one identity. The Application Server 110 further comprises a processor 125 for inserting the at least one identity retrieved from the contact card in the request for the SIP service and an output interface 132 for forwarding the request for the SIP Service to the Service Server 120.

The Application Server may act as a Subscription Function. A subscription function allows a user to subscribe for a service and may provide extensive subscription function to non-SIP devices.

Furthermore, a Subscription Proxy may be used to provide subscription and notification services to the Subscription Function. A Subscription Proxy developed in the Presence and Availability working Group of the Open Mobile Alliance (OMA PAG) may be used to provide the backend subscription and notification services for the subscription function in the Address Book (AB) server.

The Contact Server 115 may be an originating Personal Contact Card (PCC) eXtensible Markup Language (XML)

Document Management Servers (XDMS) while the Service Server 120 may be, for example, a terminating Personal Contact Card (PCC) eXtensible Markup Language (XML) Document Management Servers (XDMS), as in the exemplary embodiment that will be described now.

Figure 3:
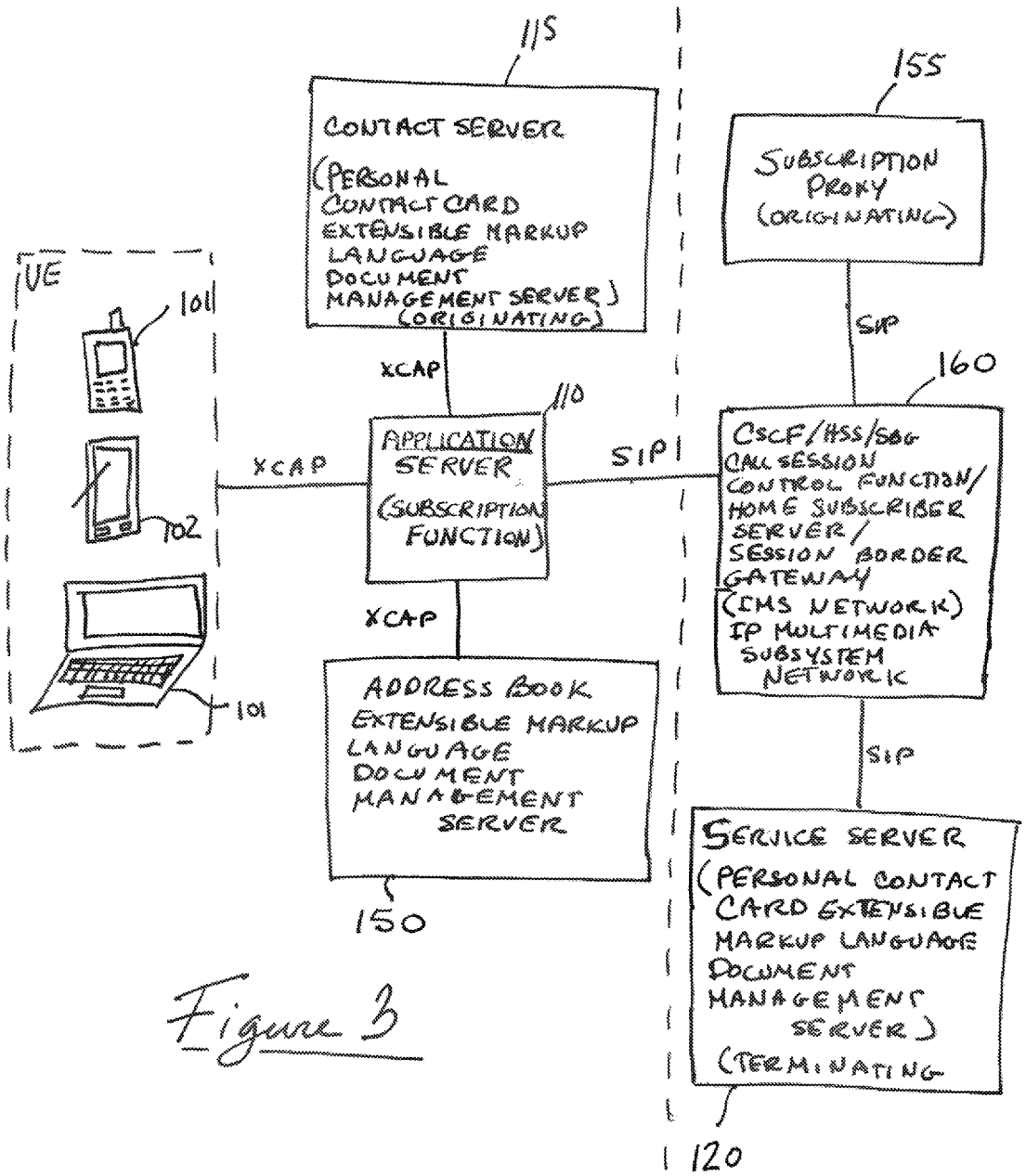
FIG. 3 is a more detailed schematic view of elements of a communication networks according to an exemplary embodiment of the invention.
Figure 4:
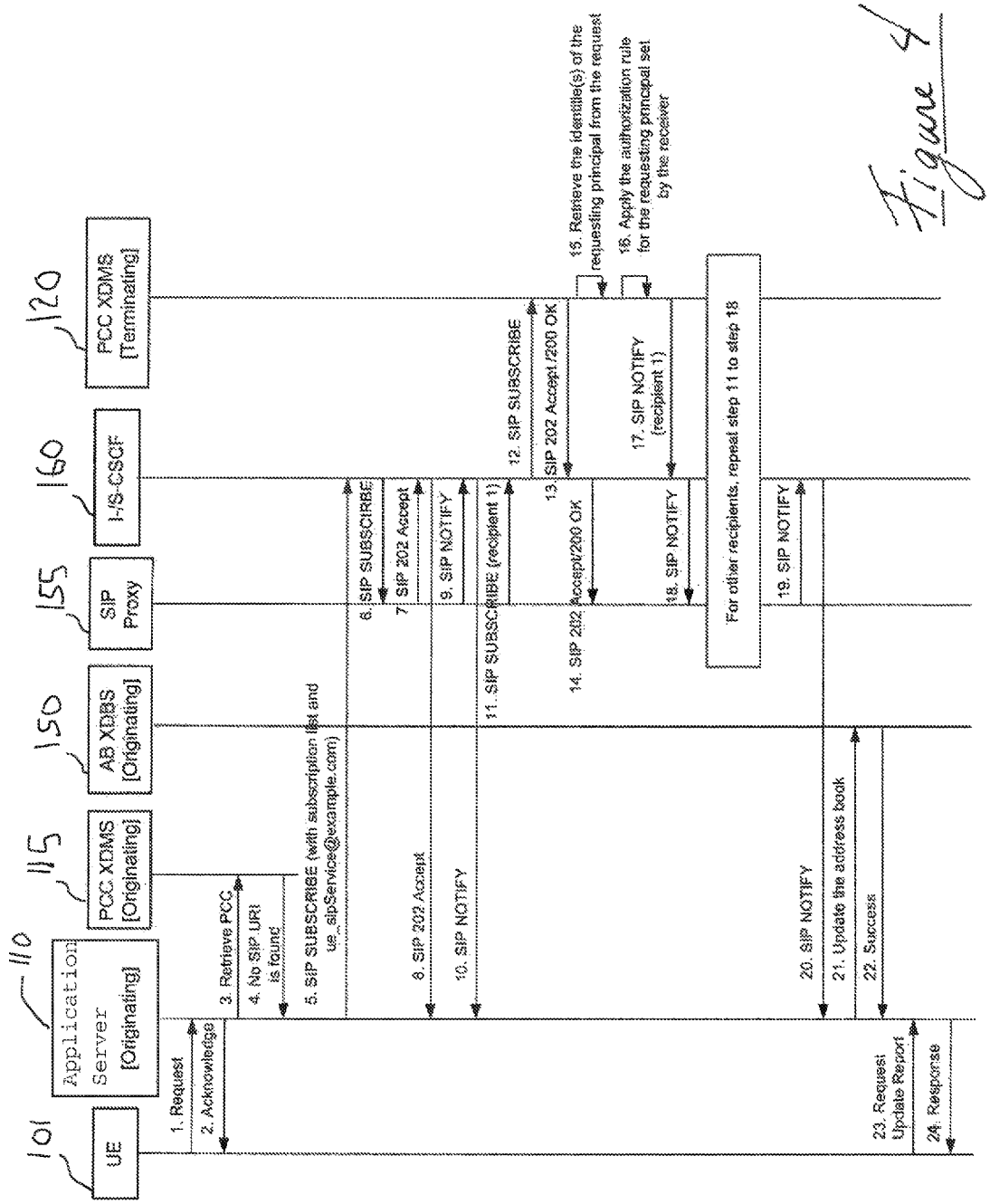
FIG. 4 is a diagram illustrating detailed steps of an exemplary embodiment of the invention.

Turning to FIGS. 3 and 4, an example describing the use of a SIP Contact Subscription Service provided by the Service Server 120, by a non-SIP device 101, will be described in more details.

In this exemplary embodiment of the invention, a mobile user selects a list of contacts from his/her address book. The user wants to have the updated PCC information of those selected contacts. The received PCC information is then stored in the user's network based address book 150.

In this example, a Subscription Function allows a user to send a subscription request to the corresponding PCC XDMS and to retrieve the updated information for a list of contacts from the user's address book. The retrieved information may be later used to update the user's network address book stored in an Address Book 150 XDMS. If in addition a Subscription Proxy 155 is used to handle a list of contacts instead of one individual contact, the Subscription Proxy 155 receives the request for a SIP service subject to a list of contacts. The Subscription Proxy 155 then retrieves the list of contacts from the request. If the identification for the user in the request is a SIP URI or a TEL URI, the Subscription Proxy 155 constructs and sends a SIP SUBSCRIBE by setting SIP URI or TEL URI in the Request-URI. If not, the SIP Proxy finds the SIP URI or TEL URI associated to the receiver using other means. If this operation fails, an error message for this user is reported to the Application Server 110. The Subscription Proxy 155 receives and processes the response from the terminating Service Server 120. Based upon the received response (success or failure) from the Service Server 120, the Subscription Proxy 155 sends a consolidated response back to the Application Server 110.

Still according to the example, the Service Server 120 receives the request for accessing the information related to the user's contacts. The Service Server 120 retrieves the other information related to the user from the request after checking the Require header in the received request. Using one or more identities from the retrieved user's information, for the authorization to access the information of the contacts, a verification is made if any access permission rule is set. Upon successful verification, the Service Server 120 retrieves the information related to the contacts according to the request and the authorization rule. The Service Server 120 then sends the response back to the Application Server 110 at the originating/sending side or to the Subscription Proxy 155, if in use.

The non-SIP device constructs and sends the request for SIP service using the user's ID, e.g. a non-SIP URI, to the Application Server 110 using HTTP or other non-SIP protocols. When the process completes, the non-SIP device 101 then processes the response to the request received from the Application Server.

The steps illustrated on FIG. 4 will now be explained in more details. In step 1, a user selects a list of contacts from his/her address book and his User Equipment (UE) 101 constructs the request and sends it to Subscription Function located in the Application Server 110 using the XCAP User Identity (XUI) as the user's identity. In step 2, the UE 101 receives an acknowledgement from the Subscription Function (located in the Application Server 110). In step 3, based upon the received XUI, the Subscription Function retrieves the user's PCC from the PCC XDMS (Contact Server 115). In step 4, in this exemplary embodiment, in the response from the originating PCC XDMS of the user, no SIP URI is found for the user. This indicates that the UE 101 is not SIP enabled. In step 5, the Subscription Function constructs a SIP SUBSCRIBE in which a Request-URI header is set to the address of Subscription Proxy, a P-Asserted-ID header is set, for example, to sip:sb@example.com, which is configurable by the service operator, a Require header is set to "PCC", the PCC information of the user is attached using MIME format and a list of contacts is attached using MIME format. Then this extended SIP SUBSCRIBE request is sent to Subscription Proxy via the I-/S-CSCF 160. The addition of this information to the SIP SUBSCRIBE will allow the identification of the user for authentication.

In step 6, the S-CSCF 160 forwards SIP SUBSCRIBE request to the Subscription Proxy 155 based upon the Request-URI. In step 7, a SIP 202 Accept is sent back to the Subscription Function via the S-CSCF 160. In step 8, the Subscription Function 110 receives the SIP 202 Accept. In step 9, the Subscription Proxy 155 sends a SIP NOTIFY to the Subscription Function 110 after receiving the SIP SUBSCRIBE request. The content of the SIP NOTIFY is not required to be reliable. In step 10, the Subscription Function receives the SIP NOTIFY from the CSCF 160. In step 11, the Subscription Proxy 155 explodes the list of contacts and builds SIP SUBSCRIBE for each contact based upon the received information. Here, the Request-URI is set to "the user's SIP URI" that is retrieved from the received SIP SUBSCRIBE, which is originally taken from the user's address book. In case where there is no SIP URI for the user, the error message may be sent to the Subscription Function 110 via SIP NOTIFY, referring to step 17. The SIP SUBSCRIBE is sent to I-/S-CSCF 160.

In step 12, the I-/S-CSCF 160 forwards the SIP SUBSCRIBE request to the corresponding PCC XDMS based upon the user's SIP URI. In step 13, a SIP 202 Accept is sent back to the Subscription Proxy 155 via the CSCF 160, for reactive authorization or a SIP 200 OK is sent back to the Subscription Proxy 155 via the CSCF 160 for pro-active authorization. In step 14, the CSCF 160 forwards the SIP response (202 Accept or 200 OK) back to the Subscription Proxy 155. In step 15, the PCC XDMS 120 retrieves the identities of the requesting principal (the contacts for whom updated information are requested by the user) from the request. In step 16, the PCC XDMS 120 applies the authorization rule for the requesting principal set by the user, if any. Normally, the terminating PCC XDMS only checks the P-asserted-Identity in the request against the authorization rule. Here, the identities of the requesting principal in the body of the request can be used for authorization. This might carry more than one identity. In step 17, the terminating PCC XDMS 120 sends a SIP NOTIFY that carries the contact's updated personal information to the Subscription Proxy 155 via the CSCF 160. In step 18, the CSCF 160 forwards the SIP NOTIFY to the Subscription Proxy 155.

In step 19, after repeating step 11 to step 16 as many times as necessary, e.g. for all the contacts, the Subscription Proxy 155 consolidates the contact information from the different contacts and sends a SIP NOTIFY towards the Subscription Function 155 via the CSCF 160. In step 20, the CSCF 160 forwards SIP NOTIFY to the Subscription Function 110. In step 21, the Subscription Function 110 updates the contact information in the user's network address book 150 based upon the received SIP NOTIFY. In step 22, the network address book 150 sends the success response to the Subscription Function 110. In step 23, if a "PULL mechanism" is used, the UE 101 tries to retrieve the "update report" on "Contact Subscription Request" using XCAP. In step 24, the Subscription Function 110 sends the response to the UE in which the notification to indicate which contact information has been updated in the network is included.

The invention has been described with reference to particular embodiments. However, it will be readily apparent to those skilled in the art that it is possible to embody the invention in specific forms other than those of the embodiment described above. The described embodiment is merely illustrative and should not be considered restrictive in any way. The scope of the invention is given by the appended claims, rather than the preceding description, and all variations and equivalents that fall within the range of the claims are intended to be embraced therein.

The invention claimed is:

1. A method for using a Session Initiation Protocol (SIP) service from a non-SIP device, the method being executed in an Application Server and comprising:
   receiving a request for a SIP service from a non-SIP device;
   retrieving a Personal Contact Card (PCC) of a user associated with the non-SIP device from a Contact Server;
   determining from the PCC that there is no SIP Uniform Resource Identifier (URI) associated with the user and, in response:
      generating a SIP request for the SIP service having a Request URI that is set to an address configured for the Application Server;
      inserting a user identity obtained from the PCC as payload data for the SIP request in Multipurpose Internet Mail Extensions (MIME) format;
      setting a Require header of the SIP request to a value indicating to a SIP Server targeted by the SIP request to identify the user associated with the SIP request from the user identity carried as the payload data in the SIP request; and
      setting a From header of the SIP request to a value corresponding to the user identity;
   sending the SIP request to the SIP Server and receiving a corresponding SIP response from the SIP server; and
   identifying the SIP response as corresponding to the non-SIP device, based on the SIP response being directed to the value set in the From header of the SIP request, and sending a corresponding notification to the non-SIP device.

2. The method of claim 1, wherein inserting the user identity obtained from the PCC as the payload data of the SIP request comprises inserting at least an email address of the user, as obtained from the PCC.

3. The method of claim 1, wherein setting the Require header comprises setting the Require header to "PCC", so that the SIP server identifies the user from the payload data.

4. The method of claim 1, wherein setting the From header of the SIP request comprises setting the From header to a device identifier that is known or derived from the request from the non-SIP device for the SIP service, or from the PCC.

5. The method of claim 1, wherein the Contact Server is an originating PCC eXtensible Markup Language (XML) Document Management Server (XDMS).

6. The method of claim 5, wherein sending the SIP request to the SIP Server comprises sending the SIP request to a terminating PCC XDMS.

7. The method of claim 6, wherein receiving the request for the SIP service from the non-SIP device comprises receiving a request for one or more PCC subscriptions for one or more contacts listed in an Address Book of the user associated with the non-SIP device, wherein generating the SIP request includes identifying the one or more contacts in the SIP request sent to the terminating PCC XDMS, and wherein the method further comprises:
   receiving updated PCC information for the one or more contacts; and
   sending the updated PCC information for the one or more contacts to an Address Book XDMS associated with the Address Book, for use in updating the Address Book.

8. An Application Server configured for enabling a non-SIP device to use a SIP service and comprising:
   one or more communication interfaces configured for communicating with a non-SIP device, a Contact Server, and a SIP Server; and
   a processor operatively associated with the one or more communication interfaces and configured to:
      receive a request for a SIP service from the non-SIP device;
      retrieve a Personal Contact Card (PCC) corresponding to a user associated with the non-SIP device from the Contact Server, the contact card containing a SIP identity associated with the user;
      determine from the PCC that there is no SIP Uniform Resource Identifier (URI) associated with the user and, in response:
         generate a SIP request for the SIP service having a Request URI that is set to an address configured for the Application Server;
         insert a user identity obtained from the PCC as payload data for the SIP request in Multipurpose Internet Mail Extensions (MIME) format;
         set a Require header of the SIP request to a value indicating to the SIP Server to identify the user associated with the SIP request from the user identity carried as the payload data in the SIP request; and
         set a From header of the SIP request to a value corresponding to the user identity;
      send the SIP request to the SIP Server and receive a corresponding SIP response from the SIP server; and
      identify the SIP response as corresponding to the non-SIP device, based on the SIP response being directed to the value set in the From header of the SIP request, and send a corresponding notification to the non-SIP device.

9. The Application Server of claim 8, wherein the processor is configured to insert the user identity obtained from the PCC as the payload data of the SIP request by inserting at least an email address of the user, as obtained from the PCC.

10. The Application Server of claim 8, wherein the processor is configured to set the Require header to "PCC" so that the SIP server identifies the user from the payload data.

11. The Application Server of claim 8, wherein the processor is configured to set the From header of the SIP request to a device identifier that is known or derived from the request from the non-SIP device for the SIP service, or from the PCC.

12. The Application Server of claim 8, wherein the Contact Server is an originating PCC eXtensible Markup Language (XML) Document Management Server (XDMS).

13. The Application Server of claim 12, wherein the SIP server is a terminating PCC XDMS and wherein the processor is configured to send the SIP request to the terminating PCC XDMS.

14. The Application Server of claim 13, wherein the request for the SIP service from the non-SIP device comprises a request for one or more PCC subscriptions for one or more contacts listed in an Address Book of the user associated with the non-SIP device, wherein the one or more communication interfaces are configured to communicate with an Address Book XDMS, and wherein the processor is configured to identify the one or more contacts in the SIP request sent to the terminating PCC XDMS, and to:

receive updated PCC information for the one or more contacts; and send the updated PCC information for the one or more contacts to the Address Book XDMS, for use in updating the Address Book.

* * * * *

UNITED STATES PATENT AND TRADEMARK OFFICE
CERTIFICATE OF CORRECTION

PATENT NO. : 8,407,352 B2  
APPLICATION NO. : 12/696830  
DATED : March 26, 2013  
INVENTOR(S) : Zhu Page 1 of 1

It is certified that error appears in the above-identified patent and that said Letters Patent is hereby corrected as shown below:

On the Title Page, in the Figure, in Step 6, in Line 1, delete "SUBSCIRBE", and insert -- SUBSCRIBE --, therefor.

In the Drawings

In Fig. 3, Sheet 3 of 4, for Tag "120", in Line 8, delete "(TERMINATING" and insert -- (TERMINATING) --, therefor.

In Fig. 4, Sheet 4 of 4, in Step 6, in Line 1, delete "SUBSCIRBE" and insert -- SUBSCRIBE --, therefor.

In the Specification

In Column 6, Line 58, delete "Function 155" and insert -- Function 110 --, therefor.

Signed and Sealed this  
Thirty-first Day of December, 2013

Margaret A. Focarino  
*Commissioner for Patents of the United States Patent and Trademark Office*